3,297,683
PROCESS FOR PREPARING β-LACTAMS
Hans Biener, Kelkheim, Taunus, Germany, assignor to Farbwerke Hoechst Aktiengesellschaft vormals Meister Lucius & Brüning, Frankfurt am Main, Germany, a corporation of Germany
No Drawing. Filed Apr. 6, 1965, Ser. No. 446,114
Claims priority, application Germany, Apr. 8, 1964, F 42,553
8 Claims. (Cl. 260—239)

The present invention relates to new β-lactam derivatives and to a process for preparing them; more particularly, it relates to β-lactam derivatives of the general formula

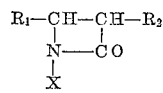

in which $R_1$ and $R_2$ each represent aliphatic hydrocarbon radicals, preferably containing 1 to 8 carbon atoms, which may be unsaturated by the presence of one or several non-conjugated double bonds and may also be linked to form a ring, and X represents the group —$SO_2Cl$ or a hydrogen atom.

Some processes for preparing β-lactams are known; however, in most cases, each of these processes permits the preparation of lactams of a determined substitution type only. For preparing alkyl- or aryl-substituted β-lactams, the addition of N-carbonyl-sulfamidic chloride on certain olefins to form β-lactam-N-sulfochlorides which may then be hydrolysed according to known methods to yield the free lactams described in German Patents 941,847 and 1,119,277 is particularly suitable.

However, from German Patents 1,119,277 and 1,112,063 it is known that the known processes do not give useful results with all olefins. Whereas olefins of the general formula

in which $R_1$ and $R_2$ represent hydrocarbon radicals or $R_1$ may represent a hydrogen atom if $R_2$ is bound by an aromatic carbon atom to the carbon atom bearing the olefinic bond, and $R_3$ and $R_4$ each represent hydrogen atoms or hydrocarbon radicals which are bound by an aliphatic carbon atom to the olefinic carbon atom, react smoothly with N-carbonyl-sulfamidic chloride, the α-olefins of the formula R—$CH=CH_2$, in which R represents an aliphatic hydrocarbon radical or a hydrogen atom, can only be reacted under conditions which simultaneously cause decomposition of the primarily formed reaction products. No process has been known as yet for preparing β-lactam derivatives by the reaction of N-carbonyl-sulfamidic chloride with olefins having an internal double bond, which correspond to the general formula $R_1$—CH=CH—$R_2$, wherin $R_1$ and $R_2$ represent aliphatic hydrocarbon radicals.

Now, I have found that β-lactam derivatives of the general formula

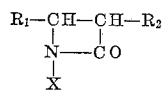

in which $R_1$ and $R_2$ represent aliphatic hydrocarbon radicals, preferably containing 1 to 8 carbon atoms which may also be linked to form a ring, and X represents the group —$SO_2Cl$ or a hydrogen atom, are obtained by reacting N-carbonyl-sulfamidic chloride with olefins of the formula

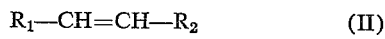

in which $R_1$ and $R_2$ have the meanings given above, and, if desired, hydrolyzing in known manner the β-lactam-N-sulfochlorides thus obtained.

In view of the disclosure of German Patent 1,112,063, describing a process for the separation of olefins of the formulae

and

in which R represents an aliphatic hydrocarbon radical, from olefins of the Formula I on the ground of the indifference of the olefins of the Formulae III and IV towards N-carbonyl-sulfamidic chloride, it was not foreseeable that olefins with internal double bond of the above Formula II can be reacted smoothly and with good yields with N-carbonyl-sulfamidic chloride to form β-lactam-N-sulfochlorides. Furthermore, it was surprising that, in the reaction of N-carbonyl-sulfamidic chloride with olefins having an internal double bond according to the present invention, practically no decomposition of the reaction mixtures takes place despite the sensitivity of the reaction products.

Examples of olefins with an internal double bond which may be used as starting compounds in the process of the present invention are: straight-chain olefins such as butene-(2), pentene-(2) and their homologues in which the double bond may be nearer to the center of the chain, for example heptene-(3), decene-(5) or octadecene-(9), further ethylenes having branched substituents or substituents that are linked to a ring, for example, 2,2-dimethyl-hexene-(3), 3,6-diethyl-octene-(4), 1-cyclohexyl-butene-(2), cyclohexene, cyclooctene, 1-methyl-cyclohexene,(2), bornylene or δ-fenchene. Furthermore, there may be used olefins that have several non-conjugated double bonds, such, for example, as nonadiene-(2,7), cyclooctadiene-(1,5) or cyclododecatriene-(1,5,9), provided that each of the carbon atoms linked with one another by a double bond is additionally linked with a hydrogen atom.

The reaction of N-carbonyl-sulfamidic chloride with olefins that have an internal double bond can be advantageously carried out in an excess of the olefin and/or in the presence of a solvent which accelerates the reaction by its polarity but does not react with N-carbonyl-sulfamidic chloride. As such a solvent, there may be used, for example, acetonitrile, nitromethane or liquid sulfur dioxide. A molar excess of olefin has in general a favorable effect on the reaction speed and on the purity of the reaction products. Advantageously, a 1.2- to 15-fold, preferably 2–8 fold, molar excess is used.

The reaction of N-carbonyl-sulfamidic chloride and the olefins with an internal double bond is suitably carried out at a temperature in the range of 10° and 180°, preferably 30° and 120° C.

When the reaction is completed, the excess olefin which may be present and/or the polar solvent are removed by distillation or by passing a stream of gas, for example nitrogen, through the reaction mixture. The higher boiling olefins and solvents are advantageously removed by distillation under reduced pressure in order to preserve the very sensitive β-lactam-N-sulfochlorides. The β-lactam-N-sulfochlorides are generally obtained in the form of viscous oils which are relatively pure and have little tendency to crystallize.

When, according to the invention, N-carbonylsulfamidic chloride is reacted with olefins of the Formula II in which the groups $R_1$ and $R_2$ are different from one another, mixtures of isomers are obtained. The formation of such mixtures may be due to the fact that the addition of the nitrogen atom (or of the carbonyl group) of the N-carbonyl-sulfamidic chloride takes place at the carbon atoms adjacent to the group $R_1$ as well as to $R_2$. Furthermore, when cis- and trans-olefins are reacted, the original cis- or trans-configuration is maintained in the lactam derivatives.

The β-lactam-N-sulfochlorides can be converted in known manner by hydrolysis into the free β-lactams. This may be carried out by stirring the β-lactam-N-sulfochlorides into water, if desired in the presence of agents imparting solubility, within a pH-range of from about 2 to 9, while simultaneously neutralizing the acid liberated.

The isolation of the formed β-lactams can be carried out by extraction with suitable solvents, for example, with methylene chloride or chloroform. After removal of the solvent by distillation, the β-lactams can be purified by distillation under reduced pressure, β-lactams which are solid at room temperature can be purified by recrystallization.

Owing to their versatile reactivity the β-lactam-N-sulfochlorides obtained according to the present invention are technically valuable intermediate products. The dialkyl substituted β-lactams prepared from these compounds by hydrolysis can be easily polymerized to yield valuable polymers which can be shaped, for example, to fibers or foils.

The following examples illustrate the invention but they are not intended to limit it thereto:

*Example 1*

283 g. (2 mols) of N-carbonyl-sulfamidic chloride and 340 g. (6 mols) of trans-butene-(2) are stirred vigorously in an autoclave at a temperature of 60° C. for about 22 hours, until a sample of the reaction mixture upon contact with water no longer generates carbon dioxide. The completion of the reaction can also be seen from the fact that the previously clear and slightly yellow reaction mixture becomes turbid. When turning off the stirring device, the initially homogeneous mixture separates into a colorless upper phase essentially consisting of excess butene and a yellow, more viscous phase consisting of the reaction product and butene dissolved in it. After removal of the butene by distillation, trans-1-chloro-sulfonyl-3,4-dimethyl-azetidinone-(2) is obtained in the form of a yellow, viscous and relatively unstable oil which crystallizes upon prolonged cooling to −10° C. By recrystallization from diisopropyl ether, the sulfochloride is obtained in pure form. Yield: 345 g.

When using instead of trans-butene-(2), cis-butene-(2) or a mixture of cis- and trans-butene-(2), there is obtained with negligible isomerization the cis-lactam-N-sulfochloride or a mixture of the cis- and trans-forms the composition of which corresponds to the proportion of isomers of the olefin used.

The β-lactam-N-sulfochlorides obtained can be hydrolysed as follows:

The sulfochloride and 6 N sodium hydroxide solution are added dropwise, at 40° to 50° C., to 200 ml. of water in such a manner that a pH-value in the range of 2 and 7 is maintained. As soon as hydrolysis is complete, the pH is brought to 7 and the free lactam formed is extracted with chloroform. After separation of the organic phase and removal of the chloroform by distillation, the β-lactam which remains behind is distilled under reduced pressure and under as mild conditions as possible. 160 g. of 3,4-dimethyl-azetidinone-(2) boiling at 54° C./0.3 mm. Hg (trans-form) or 56° C./0.3 mm. Hg (cis-form) are obtained.

*Analysis.*—Calc.: C=60.1%; H=9.1%; N=14.1%. Found: C=60.3%; H=9.3%; N=14.1%.

Another possibility of characterizing the lactam-N-sulfochlorides obtained consists in the reaction with aniline to form the anilide of 2-methyl-3-(amino-N-sulfanilido)-butyric acid:

1 - chlorosulfonyl - 3,4 - dimethyl - azetidinone - (2) is diluted with 600 ml. of methylene chloride and combined with 480 g. of aniline, while cooling. The precipitated anilide is filtered with suction, washed with water to remove the aniline hydrochloride and recrystallized from aqueous ethanol. 563 g. of 2-methyl-3-(amino-N-sulfanilido)-butyric acid anilide are obtained in the form of colorless needles melting at 185° C.

*Analysis.*— Calc.: N=12.09%; S=9.23%. Found: N=12.0%; S=9.5%.

*Example 2*

283 g. (2 mols) of N-carbonyl-sulfamidic chloride, 150 g. (2.7 mols) of butene-(2) (cis-form, trans-form or mixture of isomers) and 320 ml. of liquid sulfur dioxide are stirred in an autoclave at a temperature of about 30° C. until a sample upon contact with water no longer generates carbon dioxide. The reaction is complete after about 20 hours. The pressure is released and the whole is stirred for a short time under reduced pressure to remove as far as possible the sulfur dioxide which is dissolved in the yellow brown reaction product. The 1-chlorosulfonyl-3,4-dimethyl-azetidinone-(2) (cis-form, trans-form or mixture of isomers) which is stable for a short time only is advantageously further treated without delay. Yield: 315 g.

For characterizing the sulfochloride obtained, the alcoholysis to form the ester of 2-methyl-3-aminobutyric acid is suitable. For this purpose, a sample of 1-chlorosulfonyl-3,4-dimethyl-azetidinone-(2) is added dropwise to the 1.2-fold quantity of a solution of sodium in ethanol. The reaction mixture is then saturated with gaseous hydrogen chloride without cooling. After heating for 2 hours under reflux, the alcohol is removed by distillation and the residue is dissolved in as small a quantity of water as possible. The solution is extracted with ether, the aqueous phase is rendered strongly alkaline by means of a concentrated sodium hydroxide solution and the amino-acid ester is therefrom extracted by means of methylene chloride. After evaporation of the solvent, the 2-methyl-3-amino-butyric acid ethyl ester formed is distilled under reduced pressure. Boiling point: 71°–72° C./14 mm. Hg; $n_D^{20}=1.4285$.

*Analysis.*—Calc.: C=57.90%; H=10.42%; N=9.65%. Found: C=57.8%; H=10.3%; N=9.7%.

When the β-lactam-N-sulfochlorides are hydrolyzed in the manner described in Example 1 to free β-lactams, 125 g. of 3,4-dimethyl-azetidinone-(2) (cis-form, trans-form or mixture of isomers) are obtained; the compound is identical with the compound described in Example 1.

*Example 3*

A mixture of 283 g. (2 mols) of N-carbonyl-sulfamidic chloride and 385 g. (5.5 mols) of pentene-(2) (industrial mixture of isomers) is heated, while stirring, in an autoclave for about 20 to 23 hours to 50° C. The reaction is complete when a sample of the reaction mixture upon contact with water no longer generates carbon dioxide. After removal of excess pentene-(2) by distillation, a mixture of cis- and trans-1-chlorosulfonyl-3-methyl-4-ethyl-azetidinone-(2) and isomeric cis- and trans-1-chlorosulfonyl-3-ethyl-4-methyl-azetidinone-(2) in form of a yellow viscous oil is obtained.

When hydrolyzing the sulfochlorides in the manner indicated in Example 1 to form the free lactams, there are obtained, after extraction with chloroform and mild distillation of the lactam which has been freed from solvent by distillation under reduced pressure, 130 g. of a mixture of cis- and trans-3-methyl-4-ethyl-azetidinone-(2) and cis- and trans-3-ethyl-4-methyl-azetidinone-(2) having a boiling point of 64° C./0.02 mm. Hg are obtained.

*Example 4*

A mixture of 283 g. (2 mols) of N-carbonyl-sulfamidic chloride and 250 g. (2.5 mols) of n-heptene-(3) (industrial mixture of isomers) is heated for 2 hours at 70° C. and then for about 16 hours at 50° C., until the total quantity of N-carbonyl-sulfamidic chloride has reacted, which can be recognized by the fact that a sample of the reaction mixture, when combined with water, does not show evolution of carbon dioxide. After removal of the excess olefin under reduced pressure, there is obtained a mixture of isomers consisting of 1-chlorosulfonyl-3-ethyl-4-propyl-azetidinone-(2) and 1-chlorosulfonyl-3-propyl-4-ethyl-azetidinone-(2) in the form of a viscous oil which is stable for a short period of time only. By saponification in the manner described in Example 1, this mixture yields 148 g. of an isomeric lactam mixture consisting of 3-ethyl-4-propyl-azetidinone-(2) and 3-propyl-4-ethyl-azetidinone-(2) boiling at 69° C./0.02 mm. Hg.

*Example 5*

A mixture of 141.5 g. (1 mol) of N-carbonyl-sulfamidic chloride and 200 g. (1.8 mols) of cyclooctene, the mixture having been prepared at room temperature, is heated slowly to 40°–50° C. until a slight yellow coloration and sudden temperature rise show the onset of the reaction. By occasional cooling, during the time reaction heat is set free, the temperature is maintained at 50°–55° C. and then the reaction mixture is allowed to cool slowly. The reaction is complete when a sample of the reaction mixture upon contact with water does not generate carbon dioxide, which is the case after about 1 to 1½ hours.

After separation of the excess olefin by distillation under reduced pressure, the 2-amino-cyclooctane carboxylic acid-lactam-N-sulfochloride that has formed is hydrolyzed to the free lactam in the manner indicated in Example 1. After extraction with chloroform, evaporation of the solvent and recrystallization from water or isopropyl ether, 94 g. of 2-amino-cyclooctane carboxylic acid-lactam are obtained in the form of great colorless crystals that melt at 76° C.

*Analysis.*—Calc.: C=70.5%; H=9.87%; N=9.14%. Found: C=70.1%; H=10.2%; N=8.9%.

*Example 6*

200 g. (1.85 mols) of cyclooctadiene-1,5 are heated to 45° C. 141.5 g. (1 mol) of N-carbonyl-sulfamidic chloride are added in the course of about 20 minutes, while stirring and while maintaining the temperautre at 45°–50° C. At this temperature, the N-carbonyl-sulfamidic chloride has reacted after a few hours. The addition is complete when a sample of the reaction solution upon combination with water does not generate carbon dioxide. After removal of the excess cyclooctadiene-(1,5) by careful distillation under reduced pressure the lactam-N-sulfochloride of 2-amino-Δ⁴-cyclooctene-carboxylic acid that has formed is obtained in the form of a viscous oil.

The sulfochloride obtained can be hydrolyzed to the free lactam by the process described in Example 1. After extraction with chloroform, evaporation of the solvent and recrystallization from water or isopropyl ether, there are obtained 62 g. of 2-amino-Δ⁴-cyclooctene-carboxylic acid lactam melting at 111° C.

*Analysis.*—Calc.: C=71.5%; H=8.66%; N=9.27%. Found: C=70.9%; H=8.5%; N=9.4%.

I claim:

1. A process for preparing a β-lactam derivative of the formula

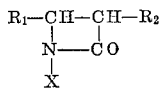

in which $R_1$ and $R_2$ are alkyl or cycloalkylalkyl of up to 8 carbon atoms or non-conjugated alkenyl of up to 8 carbon atoms, or $R_1$ and $R_2$ together represent a divalent alkylene or non-conjugated alkenylene of up to ten carbon atoms forming a ring with the α- and β-carbon atoms of the lactam ring, and X represents $SO_2Cl$ or hydrogen, which comprises reacting N-carbonyl sulfamidic chloride with an olefin of the formula $R_1$—CH=CH—$R_2$, in which $R_1$ and $R_2$ have the meanings defined above, at a temperature between 10 and 180° C. and in the presence of an inert solvent selected from the group consisting of acetonitrile, nitromethane and liquid sulfur dioxide.

2. The process defined in claim 1, wherein the molar ratio of olefin to sulfamidic chloride is 1.2 to 15:1.

3. The process defined in claim 1, wherein the molar ratio of olefin to sulfamidic chloride is 2 to 8:1.

4. A process for preparing a β-lactam of the formula

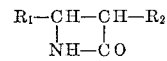

in which $R_1$ and $R_2$ are alkyl or cycloalkylalkyl of up to 8 carbon atoms or non-conjugated alkenyl of up to 8 carbon atoms, or $R_1$ and $R_2$ together represent a divalent alkylene or non-conjugated alkenylene of up to ten carbon atoms forming a ring with the α- and β-carbon atoms of the lactam ring, which comprises reacting N-carbonyl sulfamidic chloride with an olefin of the formula $R_1$—CH=CH—$R_2$, in which $R_1$ and $R_2$ have the meanings defined above, at a temperature between 10 and 180° C. and in the presence of an inert solvent selected from the group consisting of acetonitrile, nitromethane and liquid sulfur dioxide, isolating the β-lactam-N-sulfochloride thus obtained and treating said sulfochloride with an aqueous medium at a pH between 2 and 9.

5. The process defined in claim 4, wherein the molar ratio of olefin to sulfamidic chloride is 1.2 to 15:1.

6. The process defined in claim 4, wherein the molar ratio of olefin to sulfamidic chloride is 2 to 8:1.

7. A process for preparing a β-lactam derivative of the formula

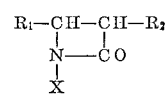

in which $R_1$ and $R_2$ are alkyl or cycloalkylalkyl of up to 8 carbon atoms or non-conjugated alkenyl of up to 8 carbon atoms, or $R_1$ and $R_2$ together represent a divalent alkylene or non-conjugated alkenylene of up to ten carbon atoms forming a ring with the α- and β-carbon atoms of the lactam ring, and X represents $SO_2Cl$ or hydrogen, which comprises reacting N-carbonyl sulfamidic chloride with an olefin of the formula $R_1$—CH=CH—$R_2$, in which $R_1$ and $R_2$ have the meanings defined above, at a temperature between 10 and 180° C., the molar ratio of olefin to sulfamidic chloride being 1.2 to 15:1.

8. A process for preparing a β-lactam derivative of the formula

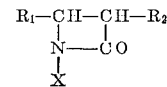

in which $R_1$ and $R_2$ are alkyl or cycloalkylalkyl of up to 8 carbon atoms or non-conjugated alkenyl of up to 8 carbon atoms, or $R_1$ and $R_2$ together represent a divalent alkylene or non-conjugated alkenylene of up to ten carbon atoms forming a ring with the α- and β-carbon atoms of the lactam ring, and X represents $SO_2Cl$ or hydrogen, which comprises reacting N-carbonyl sulfamidic chloride with an olefin of the formula $R_1$—CH=CH—$R_2$, in which $R_1$ and $R_2$ have the meanings defined above, at a temperature between 10 and 180° C., the molar ratio of olefin to sulfamidic chloride being 2 to 8:1.

References Cited by the Examiner

UNITED STATES PATENTS 3,076,800    2/1963    Graf _____ 260—239
3,185,677    5/1965    Davis _____ 260—239

FOREIGN PATENTS 1,119,277    12/1961    Germany.
  913,644    12/1962    Great Britain.

ALEX MAZEL, *Primary Examiner.*

HENRY R. JILES, *Examiner.*

A. D. ROLLINS, *Assistant Examiner.*